United States Patent
Illerhaus

(10) Patent No.: US 9,869,749 B2
(45) Date of Patent: Jan. 16, 2018

(54) SYSTEM AND METHOD TO GENERATE THREE-DIMENSIONAL MAPPING OF A TUBULAR COMPONENT LAYOUT

(71) Applicant: Roland Illerhaus, The Woodlands, TX (US)

(72) Inventor: Roland Illerhaus, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1049 days.

(21) Appl. No.: 13/737,219

(22) Filed: Jan. 9, 2013

(65) Prior Publication Data

US 2014/0191904 A1    Jul. 10, 2014

(51) Int. Cl.
| | |
|---|---|
| G01S 5/14 | (2006.01) |
| G01V 15/00 | (2006.01) |
| G01S 5/02 | (2010.01) |
| G01S 13/87 | (2006.01) |
| E21B 17/00 | (2006.01) |
| E21B 21/02 | (2006.01) |

(52) U.S. Cl.
CPC .......... *G01S 5/0257* (2013.01); *E21B 17/006* (2013.01); *E21B 21/02* (2013.01); *G01S 5/0284* (2013.01); *G01S 13/878* (2013.01); *G01V 15/00* (2013.01)

(58) Field of Classification Search
CPC ............. G01V 3/15; G01V 3/12; E21B 21/02
USPC ........................................................ 342/459
See application file for complete search history.

(56) References Cited

U.S. PATENT DOCUMENTS

| | | | |
|---|---|---|---|
| 5,576,973 A * | 11/1996 | Haddy | G01V 3/15 342/357.25 |
| 6,243,657 B1 | 6/2001 | Tuck et al. | |
| 6,415,978 B1 * | 7/2002 | McAllister | G06K 7/0004 235/462.01 |
| 6,553,322 B1 * | 4/2003 | Ignagni | F16L 55/48 701/32.4 |

(Continued)

FOREIGN PATENT DOCUMENTS

JP     2003121142 A     4/2003

OTHER PUBLICATIONS

International Search Report and Written Opinion; International Application No. PCT/US2013/074238; International Filing Date Dec. 11, 2013, Korean Intellectual Property Office; International Search Report 3 pages; Written Opinion 5 pages.

(Continued)

*Primary Examiner* — Gregory C. Issing
(74) *Attorney, Agent, or Firm* — Cantor Colburn LLP

(57) ABSTRACT

A system and method to generate a three-dimensional mapping of an arrangement of tubular components are described. The tubular components include one or more straight pipes and one or more bent segments connected at interfaces. The system includes a plurality of electronically readable identifiers, each electronically readable identifier being disposed in proximity to one of the interfaces of two of the tubular components and each side of the interface comprising at least one RFID chip. The system also includes a reader to receive a signal from each of the plurality of electronically readable identifiers in turn and a processor to process a position of the reader and each of the signals to generate the three-dimensional mapping.

13 Claims, 4 Drawing Sheets

(56) References Cited

U.S. PATENT DOCUMENTS

| | | | | |
|---|---|---|---|---|
| 6,825,793 B2 * | 11/2004 | Taylor, Jr. | | G01S 13/88 |
| | | | | 324/329 |
| 6,850,161 B1 * | 2/2005 | Elliott | | E21B 47/02224 |
| | | | | 340/539.1 |
| 7,319,387 B2 * | 1/2008 | Willson | | G01V 15/00 |
| | | | | 340/539.1 |
| 7,616,119 B2 * | 11/2009 | Corbett, Jr. | | F16L 1/11 |
| | | | | 340/10.1 |
| 7,640,105 B2 * | 12/2009 | Nielsen | | G01C 15/02 |
| | | | | 340/988 |
| 7,696,879 B2 * | 4/2010 | Lange | | G01V 15/00 |
| | | | | 235/375 |
| 8,001,858 B2 * | 8/2011 | Cogen | | F16L 55/26 |
| | | | | 73/865.8 |
| 2001/0029989 A1 * | 10/2001 | Paz | | F16L 1/11 |
| | | | | 138/104 |
| 2002/0128775 A1 * | 9/2002 | Brodie | | G01C 21/165 |
| | | | | 701/472 |
| 2005/0096883 A1 * | 5/2005 | Pacey | | G01V 3/08 |
| | | | | 702/193 |
| 2006/0109131 A1 * | 5/2006 | Sen | | G01V 15/00 |
| | | | | 340/572.8 |
| 2008/0173109 A1 | 7/2008 | Cogen et al. | | |
| 2008/0252449 A1 * | 10/2008 | Colvero | | G01S 13/74 |
| | | | | 340/540 |
| 2009/0153321 A1 | 6/2009 | Lange et al. | | |
| 2010/0211354 A1 | 8/2010 | Park et al. | | |
| 2013/0321131 A1 * | 12/2013 | Tucker | | G06K 7/10366 |
| | | | | 340/10.1 |

OTHER PUBLICATIONS

May et al., "Three-Dimensional Mapping with Time-of-Flight Cameras", Journal of Field Robotics 26(11-12), 2009, pp. 934-956.

* cited by examiner

SYSTEM AND METHOD TO GENERATE THREE-DIMENSIONAL MAPPING OF A TUBULAR COMPONENT LAYOUT

BACKGROUND

An arrangement of tubular members is often set up on location for a hydraulic fracturing or cementing job. The tubular arrangement is made up of a number of straight and bent (e.g., Chiksan™) pipe segments coupled to each other and connected to a pump at one end of the arrangement and the well head or a manifold trailer at the other end. The tubular members experience high pressures, up to 20,000 psi, for example. Pressure fluctuations from the piston pumps as well as changes in wellbore pressure during the fracturing cause large dynamic stresses within the connections of the tubular components. These stresses may result in elastic deformation of the components causing movement throughout the arrangement. Rigid connections ("hard connections") may exist between the tubular components as a result of the geometric arrangement of the tubular components. Such hard connections impair the ability to compensate for the elastic deformation with displacement. Consequently the tube material is subjected to excessive stresses with an increased probability of failing. The tubular arrangement may be visually inspected to determine which, if any, of the connections are undesirable hard connections, but the success of such an inspection in identifying all the hard connections depends almost entirely on the experience and expertise of the inspector.

SUMMARY

According to an aspect of the invention, a system to generate a three-dimensional mapping of an arrangement of tubular components, the tubular components comprising one or more straight pipes and one or more bent segments connected at interfaces, includes a plurality of electronically readable identifiers, each electronically readable identifier being disposed in proximity to one of the interfaces of two of the tubular components and each side of the interface comprising at least one RFID chip; a reader configured to receive a signal from each of the plurality of electronically readable identifiers in turn; and processor configured to process a position of the reader and each of the signals to generate the three-dimensional mapping.

According to another aspect of the invention, a method of generating a three-dimensional mapping of an arrangement of tubular components, the tubular components comprising one or more straight pipes and one or more bent segments connected at interfaces, includes disposing a plurality of electronically readable identifiers, each electronically readable identifier being disposed in proximity to one of the interfaces of two of the tubular components and each side of the interface comprising at least one electronically readable identifier; moving a reader along the arrangement of tubular components, the reader configured to receive a signal from each of the plurality of electronically readable identifiers in turn; and processing a position of the reader and each of the signals to generate the three-dimensional mapping.

BRIEF DESCRIPTION OF THE DRAWINGS

Referring now to the drawings wherein like elements are numbered alike in the several Figures.

DETAILED DESCRIPTION

As noted above, the identification and mitigation of hard connections in tubular segments significantly reduces failures caused by elastic deformation due to high pressure fluid transfer during hydraulic fracturing, cementing, and the like. Hard connections can be difficult to identify. Accordingly, embodiments of the invention described herein include a system and method to map the tubular segments in three dimensions. The three-dimensional map may facilitate analysis, by an algorithm, for example, to identify hard connections.

Figure 1:
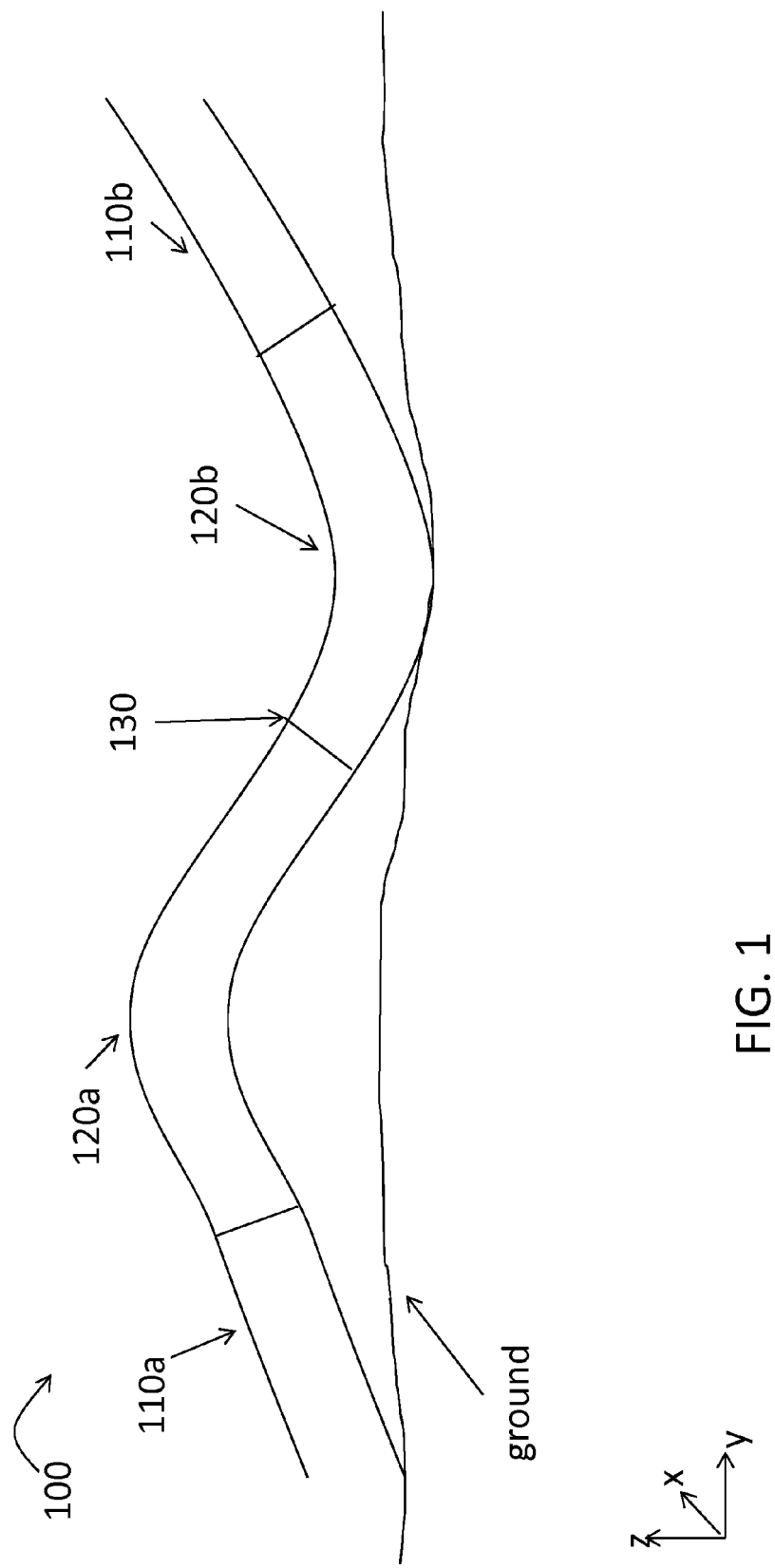
FIG. 1 depicts a perspective view of a set of tubular segments.
Figure 2:
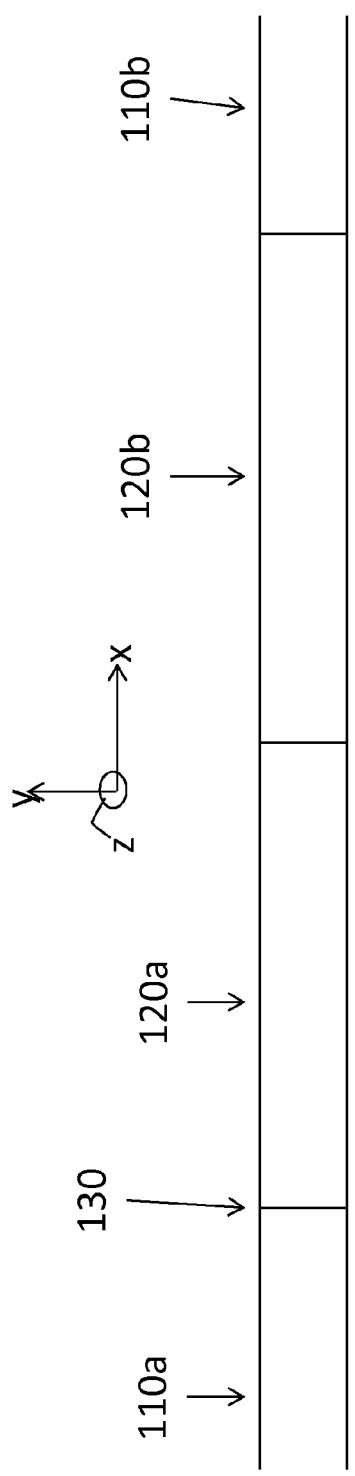
FIG. 2 depicts a perspective view of an arrangement of the tubular segments shown in FIG. 1.
Figure 3:
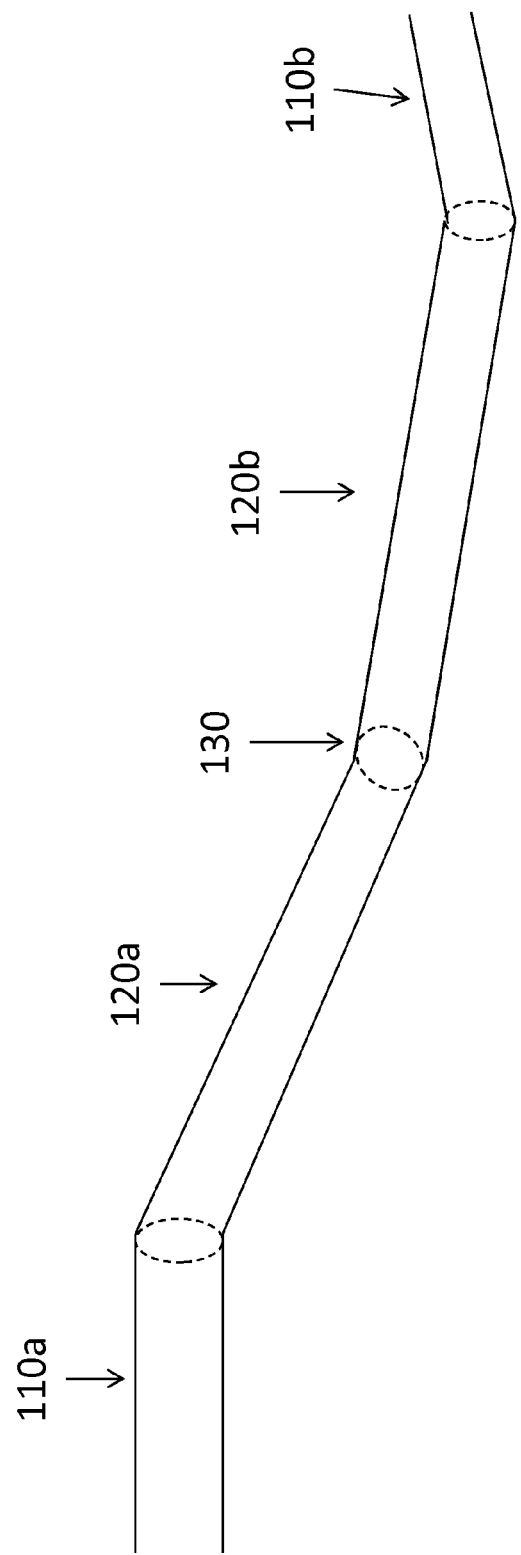
FIG. 3 depicts a perspective view of another arrangement of the tubular segments shown in FIG. 1.

FIG. 1 shows a perspective view of a set of tubular segments 100, and FIGS. 2 and 3 show perspective views of two different arrangements of the tubular segments 100 shown in FIG. 1. The specific application discussed herein as an example is one of the tubular segments 100 arranged on the ground (as shown in FIG. 1). In that case, the perspective view shown in FIG. 1 is a side view. The x and y dimensions shown in FIG. 1 define the ground plane in the embodiment shown in FIG. 1, with z representing height. The perspective views shown in FIGS. 2 and 3 would be top-down views (view along the z axis) in the exemplary arrangement of tubular segments 100 on the ground. However, alternate embodiments of the system and method discussed herein are equally applicable to an arrangement of tubular segments 100 with a different orientation and above or below ground. The tubular segments 100 include both straight pipes 110 and bent segments 120 with interfaces 130 between each pair of tubular segments 100. The arrangement of the tubular segments 100 shown in FIG. 2 includes a series of interfaces 130 that are all hard connections. This is shown in the perspective view (looking along the z axis at the x-y plane) of FIG. 2 based on the straight line connections (no offsets at interfaces 130 in the x-y plane as shown from the z-axis perspective) between tubular segments 100. The arrangement of the tubular segments 100 shown in FIG. 3 includes a series of interfaces 130 that are not hard connections. This is shown in the perspective view (looking along the z axis at the x-y plane) of FIG. 3 based on the offsets from straight line connections at interfaces 130 in the x-y plane as shown from the z-axis perspective.

While FIGS. 2 and 3 illustrate arrangements of the tubular segments 100 that clearly do include (as in FIG. 2) or do not include (as in FIG. 3) hard connections, it can be difficult to tell from a visual inspection if an interface 130 represents a hard connection that presents a vulnerability in the system. This is especially true when the angle at an interface 130 between two given tubular segments 100 seen from a z-axis perspective is not exactly 0 degrees (as in FIG. 2) but is also not clearly an angle that can withstand elastic deformation (i.e., not a hard connection). Further, based on the particular application for which the pipe segments 100 are used, the angle at the interface 130 between tubular segments 100 that represents a problematic "hard connection" may be different. For example, a given angle at the interface 130 may be less problematic based on an expected maximum pressure, its dynamic signature, and resulting stresses through the tubular segments 100 for a given application.

Figure 4:
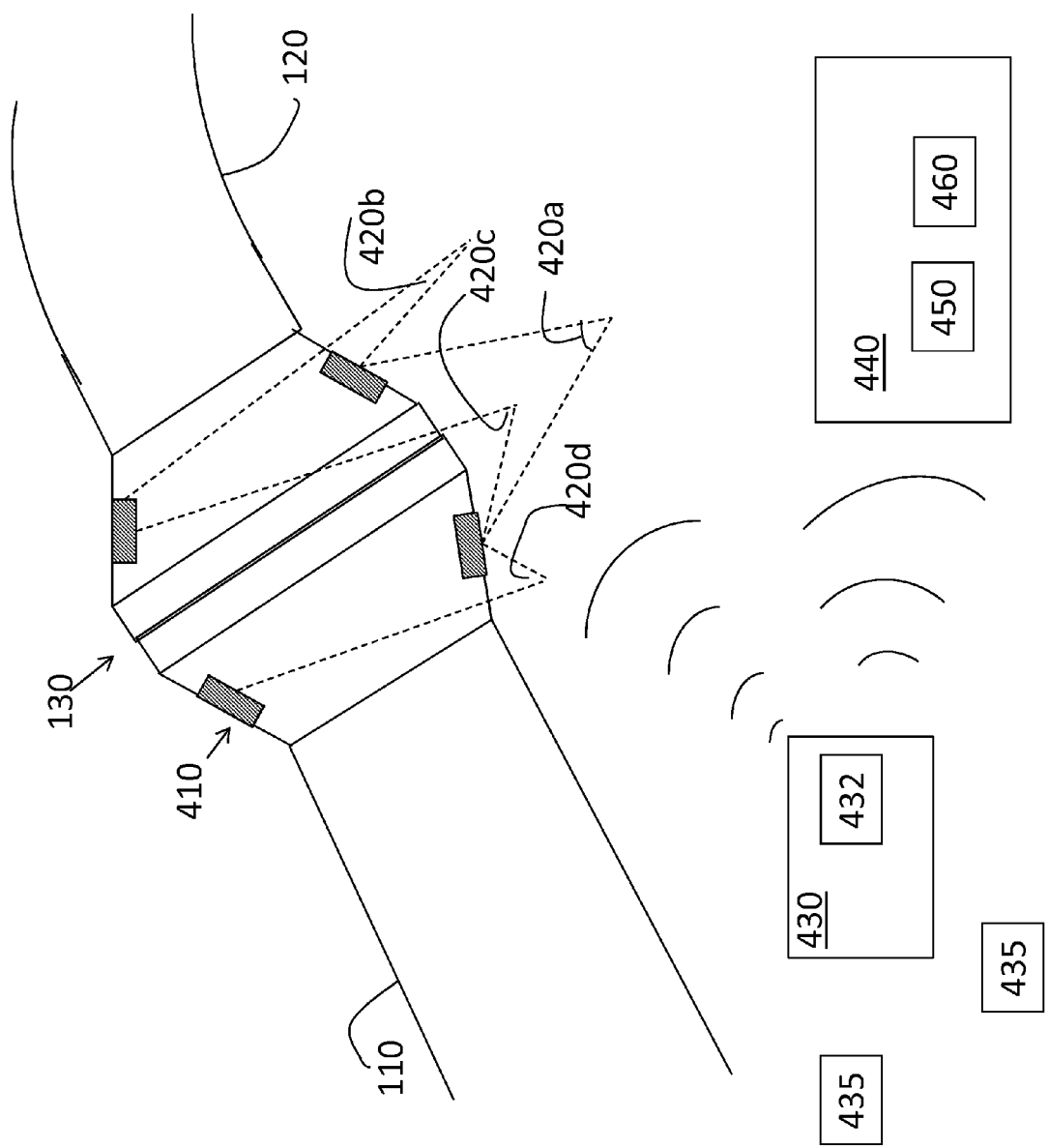
FIG. 4 illustrates a mapping system that provides a three-dimensional mapping of the arrangement of tubular segments according to an embodiment of the invention.

FIG. 4 illustrates a mapping system 400 that generates a three-dimensional mapping of the arrangement of tubular segments 100 according to an embodiment of the invention. Based on the mapping, an algorithm or even a visual inspection by an experienced technician could be used to identify hard connections. The mapping and assessment of the interfaces 130 may be performed during set up of the tubular segments 100 so that the final build of the pipe segments 100 does not include hard connections and, thereby, facilitates elastic deformation of the pipe segments 100 based on the pressure fluctuations. The embodiment of the mapping system 400 shown in FIG. 4 includes radio frequency identification (RFID) chips 410 on either side of each interface 130. The RFIDs may instead be disposed at any position on the tubular segments 100. In alternate embodiments, other electronically readable identifiers, such as bar codes, for example, may be used instead of RFID chips 410. The exemplary interface 130 shown in FIG. 4 is between a straight pipe 110 and a bent segment 120. The RFID chips 410 may be active, meaning that they actively transmit their respective codes for reception by a reader 430, or may be passive, meaning that they receive a signal from the reader 430 and then reply (they must be pinged by the reader). The reader 430 may be a hand-held reader so that it may be carried along the length of the arrangement of the tubular segments 100. The angle 420 between any two RFID chips 410 may be ensured to be less than 180 degrees from the perspective of the reader 430 position to ensure that the position of the connection shoulder and the body of the tubular segment 100 can be clearly identified in the resulting three-dimensional image.

Because the reader 430 moves along the arrangement of tubular segments 100 to read the RFID chips 410 at each interface 130, the position of the reader 430 must be determined in order to determine the position of each RFID chip 410 relative to the reader 430. The position of the reader 430 may be determined in a number of ways. In the embodiment shown in FIG. 4, a triangulation technique may be used with the reader 430 including an accelerometer 432 that provides the reader 430 position in conjunction with triangulation antennas 435. The reader 430 may be in communication (wireless or wire) with a processing system 440 that includes one or more processors 450 and one or more memory devices 460 in order to determine the reader 430 position and to determine the position, in three-dimensional space, of each RFID chip 410 based on the signal received at the reader 430. The processing system 440 may be used to determine the three-dimensional position of the reader 430 and also the relative positions of each of the RFID chips 410 interrogated or read by the reader 430. The output of the processing system 440 may be directly to an algorithm or other process to identify hard connections. In alternate embodiments, the output of the processing system 440 may be a visual mapping of the tubular segments 100.

Figure 5:
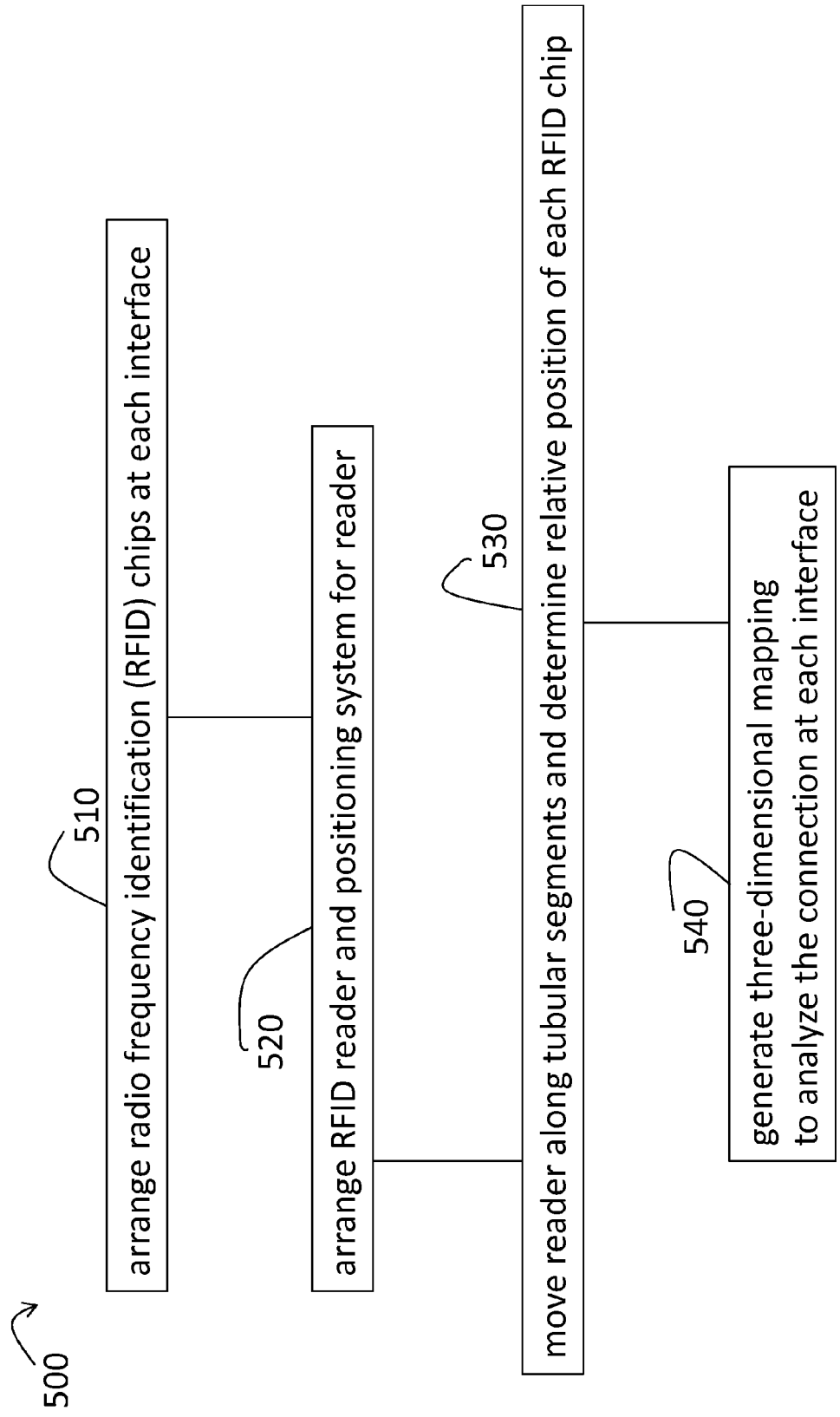
FIG. 5 is a flow diagram of a method of generating a three-dimensional mapping of the arrangement of tubular segments according to an embodiment of the invention.

FIG. 5 is a flow diagram of a method 500 of generating a three-dimensional mapping of the arrangement of tubular segments 100 according to an embodiment of the invention. Arranging RFID chips 410 at each interface 130 (block 510) includes disposing at least one RFID chip 410 at each side of the interface 130. The arranging may also include ensuring that no two RFID chips 410 form an angle of 180 degrees. Arranging the RFID reader 430 and positioning system for the reader 430 (block 520) may include disposing an accelerometer 432 in the reader 430 and triangulation antennas 435 such that the position of the reader 430 may be determined as it moves. Moving the reader 430 along the tubular segments 100 and determining the relative position of each RFID chip 410 (block 530) involves the processing system 440. Generating the three-dimensional mapping to analyze the connection at each interface 130 (block 540) may include outputting the three-dimensional mapping of the arrangement of tubular segments 100 to an algorithm and/or displaying the mapping for visual analysis.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A system to generate a three-dimensional mapping of an arrangement of tubular components, each tubular component having a connection shoulder on each end of the tubular component, the tubular components comprising one or more straight pipes and one or more bent segments connected at interfaces, each of the interfaces being subjected to one of a relatively higher stress or a relatively lower stress, the system comprising:
   a plurality of electronically readable identifiers, each electronically readable identifier being disposed in one of the connection shoulders and in proximity to one of the interfaces of two of the tubular components, wherein each connection shoulder comprises two electronically readable identifiers;
   a reader configured to receive a signal from each of the plurality of electronically readable identifiers in turn; and
   a processor configured to process a position of the reader and each of the signals to generate the three-dimensional mapping, wherein the processor outputs the three-dimensional mapping of interfaces that are subjected to the relatively higher stress and interfaces that are subjected to the relatively lower stress,
   wherein an angle between the two electronically readable identifiers comprised on each connection shoulder is less than 180 degrees from the perspective of the reader.

2. The system according to claim 1, wherein the electronically readable identifiers are active radio frequency identification (RFID) chips that transmit the signal intermittently.

3. The system according to claim 1, wherein the electronically readable identifiers are passive radio frequency identification (RFID) chips that transmit the signal in response to a signal from the reader.

4. The system according to claim 1, wherein the electronically readable identifiers are bar codes that convey identification information in the signal read by the reader.

5. The system according to claim 1, further comprising a positioning system comprising an accelerometer and a triangulation antenna to determine a position of the reader as it moves along the arrangement of tubular components.

6. The system of claim 1, wherein each connection shoulder comprises a third electronically readable identifier, and wherein no two of the two electronically readable identifiers and the third electronically readable identifier forms an angle of 180 degrees from the perspective of the reader.

7. The system according to claim 1, wherein the processor outputs the three-dimensional mapping for display to a user.

8. A method of generating a three-dimensional mapping of an arrangement of tubular components, each tubular component having a connection shoulder on each end of the tubular component, the tubular components comprising one or more straight pipes and one or more bent segments connected at interfaces, each of the interfaces being subjected to one of a relatively higher stress or a relatively lower stress, the method comprising:

disposing a plurality of electronically readable identifiers, each electronically readable identifier being disposed in one of the connection shoulders and in proximity to one of the interfaces of two of the tubular components, wherein each connection shoulder comprises two electronically readable identifiers;

moving a reader along the arrangement of tubular components the reader configured to receive a signal from each of the plurality of electronically readable identifiers in turn; and processing a position of the reader and each of the signals to generate the three-dimensional mapping; and outputting the three-dimensional mapping of interfaces that are subjected to the relatively higher stress and interfaces that are subjected to the relatively lower stress, wherein an angle between the two electronically readable identifiers comprised on each connection shoulder is less than 180 degrees from the perspective of the reader.

9. The method according to claim 8, wherein the disposing the plurality of electronically readable identifiers includes disposing active radio frequency identification (RFID) chips that transmit the signal intermittently.

10. The method according to claim 8, wherein the disposing the plurality of electronically readable identifiers includes disposing passive radio frequency identification (RFID) chips that transmit the signal in response to a signal from the reader.

11. The method according to claim 8, wherein the disposing the plurality of electronically readable identifiers includes disposing bar codes that convey identification information in the signal read by the reader.

12. The method according to claim 8, further comprising determining a position of the reader during the moving using a positioning system comprising an accelerometer and a triangulation antenna.

13. The method according to claim 8, further comprising displaying the three-dimensional mapping.

* * * * *